even ates atent fficen 2,817,236
Patented Dec. 24, 1957

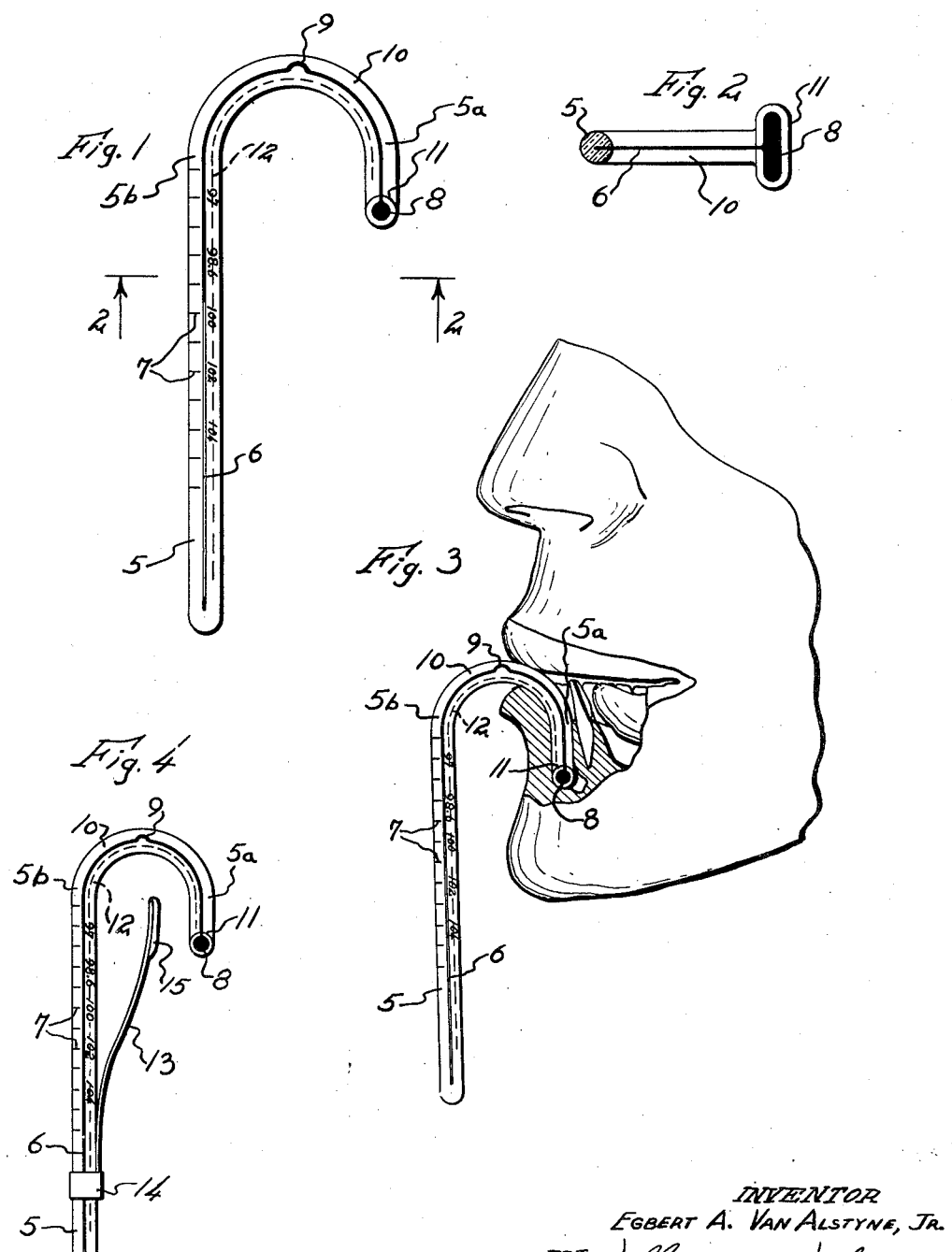

2,817,236

LIP-SUPPORTED FEVER THERMOMETER

Egbert A. Van Alstyne, Jr., Albert Lea, Minn.

Application March 8, 1954, Serial No. 414,538

2 Claims. (Cl. 73—371)

This invention relates to thermometers, and more specifically to oral fever thermometers.

Body temperature is generally measured with a straight thermometer having a bulb of mercury on one end. The bulb end of the thermometer is placed in the soft moist tissue under the tongue, and the other end of the thermometer extends between the upper and lower teeth and out between the lips. Although body temperature is registered with substantial accuracy with these thermometers, they do have some marked disadvantages. For instance, such thermometers are subject to breakage, especially if the person whose temperature is being taken should accidentally or unconsciously bite down on the thermometer. Serious injury to the patient could result from such breakage of the thermometer in his mouth.

In addition, it is practically impossible to take the body temperature of an unconscious patient with the conventional straight oral thermometer. This is so because the patient must consciously hold the thermometer with his lips, so that the bulb thereof will remain in the proper position, and because the patient must consciously separate his upper and lower teeth to allow the thermometer to be inserted therebetween and he must consciously hold his teeth apart to prevent breaking of the thermometer. Because an unconscious person cannot do these conscious acts, a conventional straight type oral thermometer can hardly be used to take his temperature. The same problems occur when it is desired to determine the body temperature of a very young child.

Body temperature may be measured whenever an intimate physical contact may be had between the thermometer and the flesh of the body. The soft moist tissue beneath the tongue is a good location for measuring body temperature because the bulb of the thermometer may be substantially completely surrounded by the tissue and by the saliva which is in contact with the tissue and has a temperature substantially the same as that of the tissue. For the same reason the soft moist tissue adjacent to the juncture between the labial side of the lower gum and the inside of the lower lip is another satisfactory location for measuring body temperature. This soft tissue on the inside of the lower lip will substantially surround the bulb of the thermometer and give a good indication of body temperature.

It is well known that rectal temperatures differ by approximately one degree from oral temperatures as measured by presently known means. While I have found that the oral temperature measured with my new thermometer, as herein disclosed, varies slightly from the oral temperatures measured in the usual manner, the differential remains substantially constant throughout the various ranges of body temperatures. Therefore the temperature measured with my new thermometer is as indicative of a person's state of health as temperatures measured in any other manner.

An object of my invention is to provide a new and improved oral thermometer which is of simple and inexpensive construction and which is particularly adapted for safe and convenient use with all types of patients.

Another object of my invention is to provide a novel oral thermometer which may be used to measure the body temperature of a person without requiring conscious effort or cooperation on his part, and which is not required to be gripped between the patient's teeth to be securely anchored in operative position.

Still another object of my invention is to provide a new oral thermometer for use in determining body temperature of a person and in such a manner as to substantially reduce the possibility of breakage of the thermometer while in use and therefore reduce the possibility of injury to the person.

A further object of my invention is to provide an improved oral fever thermometer which may be hung over and solely supported by the lower lip of the person whose temperature is to be taken.

These and other objects and advantages of my invention will more fully appear from the following description made in connection with the accompanying drawings wherein like reference characters refer to the same parts throughout the several views and in which:

Fig. 1 is a diagrammatic representation of my invention;

Fig. 2 is a cross-sectional view taken at 2—2 of Fig. 1;

Fig. 3 is a diagrammatic representation of my invention inserted into a person's mouth; and Fig. 4 shows an alternative form of my invention.

My invention includes, as shown in the figures, an oral clinical fever thermometer. The thermometer has an elongated member or stem 5 which is made of any suitable rigid and transparent material, such as glass. The stem 5 has a slender and elongated interior passage 6. The passage 6 extends longitudinally of the stem 5 and through the center thereof. The stem 5 may be of any suitable cross-sectional configuration, such as round, triangular or substantially flat. The interior passage 6 is sealed closed at both of its end portions and has the air removed therefrom. Graduations 7 are marked on the elongated stem 5.

Temperture measuring means including sensing means, such as bulb reservoir 8 and a quantity of liquid stored therein, and including indicating means, such as the thread of liquid 11 in the passage 6 are operatively associated with the stem 5. In the form shown the reservoir 8 or sensing element is slightly elongated and extends transversely of the stem 5. The reservoir 8 is formed integrally of the stem 5 and has a hollow interior communicating with the passage 6 of the stem. The reservoir 8 should be shaped so as to allow the same to be maintained in intimate contact with the soft flesh within the person's mouth. The slender passage 6 has a detour 9 therein and adjacent to the reservoir 8. A quantity of liquid 11 which is voluometrically responsive to heat change, such as mercury, fills the reservoir 8 and fills a portion of the slender passage 6 adjacent to the reservoir 8. When the liquid 11 in the reservoir is heated, it will expand and extend further into the slender passage 6. The graduations 7 are calibrated to measure the extension of the mercury in chamber 6 and indicate in degrees the temperature of the medium contacting the reservoir 8.

The upper end portion 10 or the intermediate portion of the stem 5, which is adjacent to the reservoir 8, is curved to form a substantially inverted U-shaped hook in the stem of the thermometer and provides an inner leg 5a and outer leg 5b substantially longer than inner leg 5a and substantially parallel therewith and spaced therefrom a distance substantially equal to or slightly greater than the thickness of the lower lip. The stem 5 is thereby adapted to be inserted into a person's mouth and to hang solely by the hook portion 10 on the person's lower lip. When the thermometer is so inserted into a person's mouth, the mercury-carrying reservoir will be in intimate contact with the soft tissue below the person's lower teeth and between his lower lip and the gum of the lower teeth. The bulb reservoir 8 and the depending inner leg adjacent thereto will be securely held by the inside of the lower lip against the labial side of the gum and in the soft tissue at the juncture therebetween.

The hook portion may have such a radius to separate the inner and outer depending legs 5a and 5b to allow the bulb to be inserted into a person's mouth on the lingual side of the lower teeth in intimate contact with the soft tissue beneath the tongue and to allow the graduated stem of the thermometer to extend downwardly along the chin. Whether the reservoir is placed behind a person's lower teeth or in front of his lower teeth, the hook portion of the thermometer will engage and be supported by the person's lower lip.

An elongated reinforcing member 12, such as a thin steel wire, may be molded into the straight stem 5 and hook portion 10. Such a wire will strengthen the thermometer against breaking and shattering.

I have found by experimentation that the temperatures measured by my thermometer placed forwardly of the lower teeth and inside the lower lip will be slightly lower than temperatures measured beneath the tongue. The difference between the temperatures taken in these two locations is approximately the same throughout substantially the entire range of temperatures measured with an oral thermometer. There is, therefore, a definite relationship between the actual body temperatures and the temperatures measured at the location between the lower teeth and the lower lip. However, it is obvious that the indication of body temperature when taken forwardly of the lower teeth is a highly accurate relative temperature so as to be indicative of the person's state of health.

Although I have found that for most types of patients my thermometer herein described will be securely held in place by the lower lip, it may be desirable in some cases to provide additional gripping means to positively hold the inner leg 5a and the reservoir 11 in intimate contact with the soft tissue between the patient's lower lip and the labial side of the adjacent gum. I provide, as shown in Figure 4, an elongated spring clip 13 having a mounting sleeve 14 on the lower end portion thereof. The mounting sleeve 14 surrounds the outer leg 5b of the thermometer in close-fitting relationship to be removably mounted thereon. The spring clip 13 extends upwardly from the sleeve 14 and extends between and substantially parallel to the inner leg 5a and outer leg 5b. Clip 13 terminates adjacent to the top curved portion of the hook of the thermometer. A soft pad 15 made of rubber or the like may be mounted on the upper end portion of spring clip 13 and adjacent to the inner leg 5a. When the reservoir 11 and inner leg 5a of the thermometer are positioned adjacent the inside of the patient's lower lip, the spring clip 13 and pad 15 will engage the outside of the patient's lower lip and cause the inner leg 5a to securely engage the inside of the lower lip and to hold the thermometer in proper position. The pad 15 will protect the outside of the patient's lower lip from being injured by the clip.

It will be seen that I have provided a new and improved oral thermometer which is of simple and inexpensive operation and construction. My new thermometer is of different construction than the ordinary straight type of oral thermometer and is particularly adapted for use with substantially all types of patients.

It will also be apparent that I have provided a novel oral thermometer which may be used to measure the body temperature of a person without requiring him to exert conscious effort. This feature is highly important where the body temperature of an unconscious person or a very young child is to be taken. Taking the body temperature of an unconscious person is accomplished by inserting the mercury reservoir of the thermometer into the person's mouth forwardly of his lower teeth and into intimate contact with the soft tissue between the lower lip and the gum of the lower teeth. When the person's body temperature is taken in this manner, the thermometer will be supported by his lower lip and the person need not exert any conscious effort whatever. He need not consciously hold the thermometer with his lips and he need not open his own mouth or hold his mouth open after the thermometer has been inserted therein.

It will also be observed that I have provided a new oral thermometer which may be used to determine body temperature of a person in such a manner as to substantially reduce the possibility of breakage of the thermometer. The thermometer is placed over his lower lip where there is little chance of the thermometer breaking while it is in his mouth. The thermometer need not engage his teeth or be inserted between his upper and lower teeth. Because the thermometer is not likely to be broken while it is in the patient's mouth, the chance of injury to the patient is also substantially reduced.

It will, of course, be understood that various changes may be made in the form, detail, arrangement and proportion of the parts without departing from the scope of my invention.

What I claim is:

1. An oral type clinical thermometer for determining body temperature, said thermometer comprising an elongated hollow member having an upper portion which is doubled back upon itself in a manner to provide a substantially U-shaped hook with a top portion and depending inner and outer legs, said legs having lower ends, a reservoir formed integrally of said inner leg and at the lower end thereof, said reservoir communicating with the hollow interior of said stem in fluid transmitting relation and containing a thermally expandable and contractible fluid to provide a temperature-indicating thread of fluid in said stem, said inner leg extending downwardly and being spaced apart from said outer leg to permit positioning of said reservoir adjacent to the juncture between the lower lip and the labial side of the gum, and a gripping element carried by one of said legs and resiliently urged toward said inner leg to resiliently engage the outer surface of the lower lip and positively hold the reservoir in intimate contact with the inner surface thereof, whereby when said inner leg and reservoir are inserted between the inside of the lower lip and the labial side of the gum adjacent thereto, said inner leg and gripping element will securely grip the lip to hold said reservoir in engaged position therein.

2. An oral type clinical thermometer for determining body temperature, said thermometer comprising an elongated member having a slender interior passage extending longitudinally thereof and having an upper portion which is doubled back upon itself in a manner to provide a substantially U-shaped hook with a top portion and depending inner and outer legs, said legs having lower ends, a reservoir formed integrally of said inner leg and at the lower end thereof and in communication with the passage therein in fluid transmitting relation, said reservoir containing a thermally expandable and contractible fluid to provide a temperature-indicating thread of fluid in said stem, said inner leg extending downwardly and being spaced apart from said outer leg to permit positioning of said reservoir adjacent to the juncture between the lower lip and the labial side of the gum, an elongated and laterally shiftable spring clip having upper and lower end portions and extending between and substantially parallel to said inner and outer legs, said clip being resiliently urged toward said inner leg to engage the outside of the lower lip and positively hold the reservoir in intimate contact with the inner surface thereof, a mounting sleeve formed in said lower end portion of said spring clip and surrounding said outer leg in sliding relation, and a soft pad affixed to said upper end portion of said spring clip to engage the outside of said lower lip and prevent injury thereto.

References Cited in the file of this patent

UNITED STATES PATENTS

| | | |
|---|---|---|
| 358,141 | Barry | Feb. 22, 1887 |
| 1,669,874 | Klein | May 15, 1928 |
| 1,811,190 | Tate | June 23, 1931 |
| 2,445,539 | Singer | July 20, 1948 |

FOREIGN PATENTS

| | | |
|---|---|---|
| 718 | Great Britain | Mar. 28, 1912 |